(12) United States Patent
Doering et al.

(10) Patent No.: US 6,427,109 B1
(45) Date of Patent: Jul. 30, 2002

(54) POWERTRAIN TORQUE ESTIMATE

(75) Inventors: Jeffrey Allen Doering, Canton; Mrdjan J. Jankovic, Birmingham, both of MI (US)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/976,962

(22) Filed: Oct. 11, 2001

(51) Int. Cl.⁷ ............................................. B60K 41/28
(52) U.S. Cl. ............................. 701/54; 701/53; 701/55; 701/57; 701/58; 701/59
(58) Field of Search ........................... 701/54, 53, 51, 701/55, 57, 58, 59, 61; 477/43, 46, 48, 49, 63, 98, 105, 108, 110, 109, 906

(56) References Cited

U.S. PATENT DOCUMENTS

| | | | |
|---|---|---|---|
| 4,953,091 A | * 8/1990 | Baltusis et al. | 701/67 |
| 5,108,348 A | 4/1992 | Bornmann | 474/18 |
| 5,309,790 A | 5/1994 | Tanaka | 74/731.1 |
| 5,452,207 A | 9/1995 | Hrovat et al. | 701/1 |
| 5,458,545 A | 10/1995 | Adam et al. | 475/120 |
| 5,514,047 A | 5/1996 | Tibbles et al. | 477/46 |
| 5,713,815 A | 2/1998 | Funatsu et al. | 477/46 |
| 5,910,176 A | 6/1999 | Creger | 701/59 |
| 5,999,873 A | 12/1999 | Minowa et al. | 701/51 |
| 6,066,070 A | 5/2000 | Ito et al. | 477/43 |
| 6,173,226 B1 | 1/2001 | Yoshida et al. | 701/51 |
| 6,174,260 B1 | 1/2001 | Tsukada et al. | 475/50 |
| 6,188,944 B1 | 2/2001 | Kolmanovsky et al. | 701/54 |
| 6,226,585 B1 | * 5/2001 | Cullen | 701/54 |
| 6,278,925 B1 | * 8/2001 | Wozniak | 701/54 |

* cited by examiner

*Primary Examiner*—William A. Cuchlinski, Jr.
*Assistant Examiner*—Marthe Marc-Coleman
(74) *Attorney, Agent, or Firm*—Julia Voutyras; Allan J. Lippa

(57) ABSTRACT

An improved method for estimating an input torque to the continuously variable transmission (CVT) is presented. The method includes calculating torque adaptation coefficients when the torque converter clutch is unlocked, and an accurate torque value can be obtained based on the torque converter characteristics. The adaptation coefficients are then used to correct the transmission torque estimate, which is then used to determine proper CVT clamping forces. This method improves fuel economy, transmission durability, and customer satisfaction.

19 Claims, 3 Drawing Sheets

POWERTRAIN TORQUE ESTIMATE

FIELD OF THE INVENTION

The present invention relates generally to a system and a method of controlling a vehicle equipped with a continuously variable transmission, and more particularly to estimating an input torque to a continuously variable transmission.

BACKGROUND OF THE INVENTION

Vehicles usually have an internal combustion engine coupled to an automatic transmission, which could be a Continuously Variable Transmission (CVT). In a CVT, which typically comprises a metal belt sliding on two pulleys (a primary pulley coupled to the engine and a secondary pulley coupled to the drive shaft), the gear ratio can be continuously changed by applying hydraulic pressures to the pulleys and thus changing the belt winding radius. By continuously varying the transmission ratio, the powertrain of the vehicle equipped with CVT can be controlled such that actual engine speed is matched to the desired engine speed at which most efficient fuel consumption can be achieved. Thus, a CVT equipped vehicle can achieve improved fuel efficiency throughout the entire range of vehicle speeds made available by the infinitely variable driveline as compared to vehicles with the conventional automatic transmission.

The inventors herein have recognized that a CVT system may require a controller for determining a proper amount of clamping forces to be applied to the primary and secondary pulleys to prevent the belt from slipping. The clamping force to the secondary pulley is determined based on the amount of estimated CVT input torque, and the clamping force to the primary pulley is adjusted such that desired transmission ratio is achieved. The inventors herein have further recognized that the accuracy of the CVT input torque estimate is important to the proper operation of the Continuously Variable Transmission. If the torque estimate is too low, the clamping force will also be too low, and the belt can slip, which may result in rapid degradation and wear of the belt. Additionally, the CVT requires much higher clamping forces than the conventional transmission (typically 2–4 times higher) to prevent the belt from slipping on the pulleys. Therefore, if the clamping force estimate is too high due to inaccuracies in the CVT input torque estimate, the fuel economy penalty could be very significant. In other words, over- or underestimating the CVT input torque could result in reduced vehicle durability, fuel economy and overall customer satisfaction.

The CVT input torque is estimated based on the information provided by sensors such as the engine speed sensor, mass airflow sensor, air-fuel ratio sensor, etc. The inventors have further recognized that it may be possible for these sensor signals to drift in range due to electrical degradation or chemical contamination. Therefore, since the CVT input torque estimate may not be accurate due to sensor as well as engine tolerances, the resulting secondary pulley clamping force estimate which is based on the CVT input torque estimate may also not be as accurate as possible.

The inventors have additionally recognized that an accurate estimate of the CVT input torque could be obtained based on a torque converter ratio when the torque converter clutch is unlocked. The accuracy of this estimate is affected mainly by the variations of the torque converter ratio (which depend on the converter design tolerances), and may be more accurate than the engine torque-based estimate, which is affected by engine, sensor and torque converter tolerances.

SUMMARY OF THE INVENTION

The disadvantages of prior approaches are overcome by a method for controlling a powertrain of a vehicle having an engine coupled to a continuously variable transmission, the vehicle further having a torque converter coupled between the engine and the transmission, including: providing an indication that a torque converter clutch is unlocked; learning a powertrain torque correction value when said indication is provided; adjusting a powertrain torque estimate based on said correction value; and determining a control signal for adjusting a transmission clamping force based on said adjusted powertrain torque estimate.

In other words, this method determines correction coefficients when the torque converter clutch is unlocked. These coefficients are then used to calibrate an engine model such that the error between the more accurate torque converter-based CVT input torque estimate and the less accurate engine-based CVT input torque estimate is minimized. Thus, by controlling a transmission clamping force based on an adjusted powertrain torque estimate, it is possible to provide just enough force to transmit the torque, without providing too much force, which can waste fuel.

An advantage of the above aspect of invention is that improved fuel efficiency can be achieved by eliminating overestimating of clamping forces. Also, improved reliability and customer satisfaction will be achieved by preventing CVT belt slippage due to clamping force underestimation.

The above advantages and other advantages, objects and features of the present invention will be readily apparent from the following detailed description of the preferred embodiments when taken in connection with the accompanying drawings.

BRIEF DESCRIPTION OF THE DRAWINGS

The advantages described herein will be more fully understood by reading an example of an embodiment in which the invention is used to advantage, referred to herein as the Description of Preferred Embodiment, with reference to the drawings, wherein.

DESCRIPTION OF PREFERRED EMBODIMENT(S)

As will be appreciated by those of ordinary skill in the art, the present invention is independent of the particular underlying engine technology and configuration. As such, the present invention may be used in a variety of types of internal combustion engines, such as conventional engines, in addition to direct injection stratified charge (DISC) or direct injection spark ignition engines (DISI).

Figure 1:
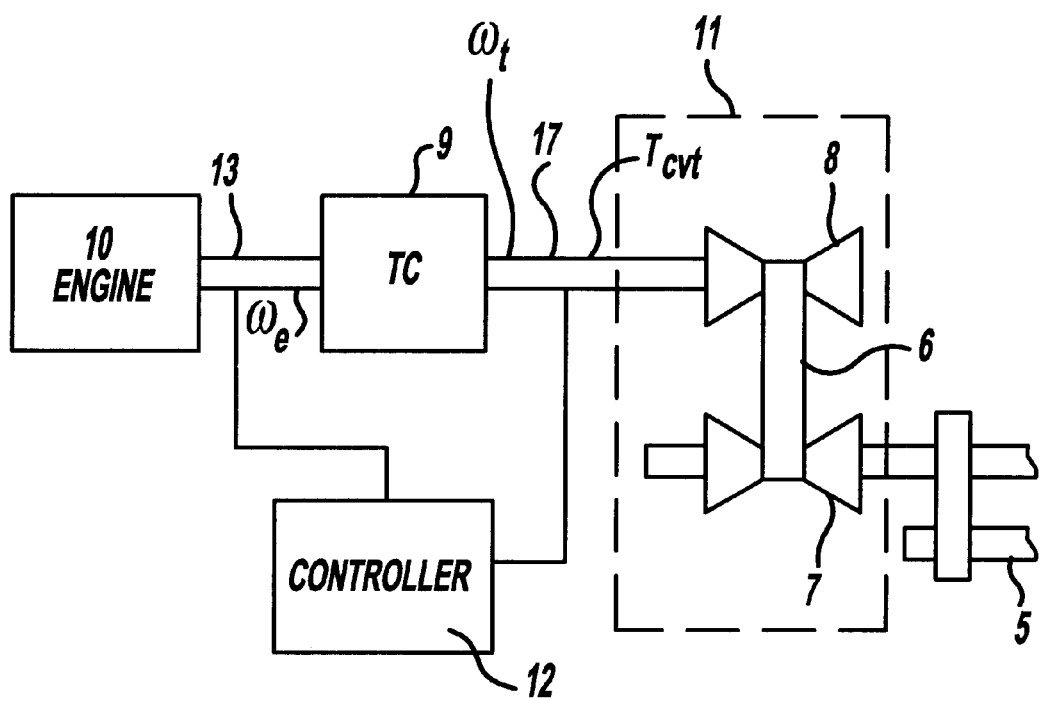
FIG. 1 is a block diagram of a vehicle illustrating various components related to the present invention.
Figure 2:
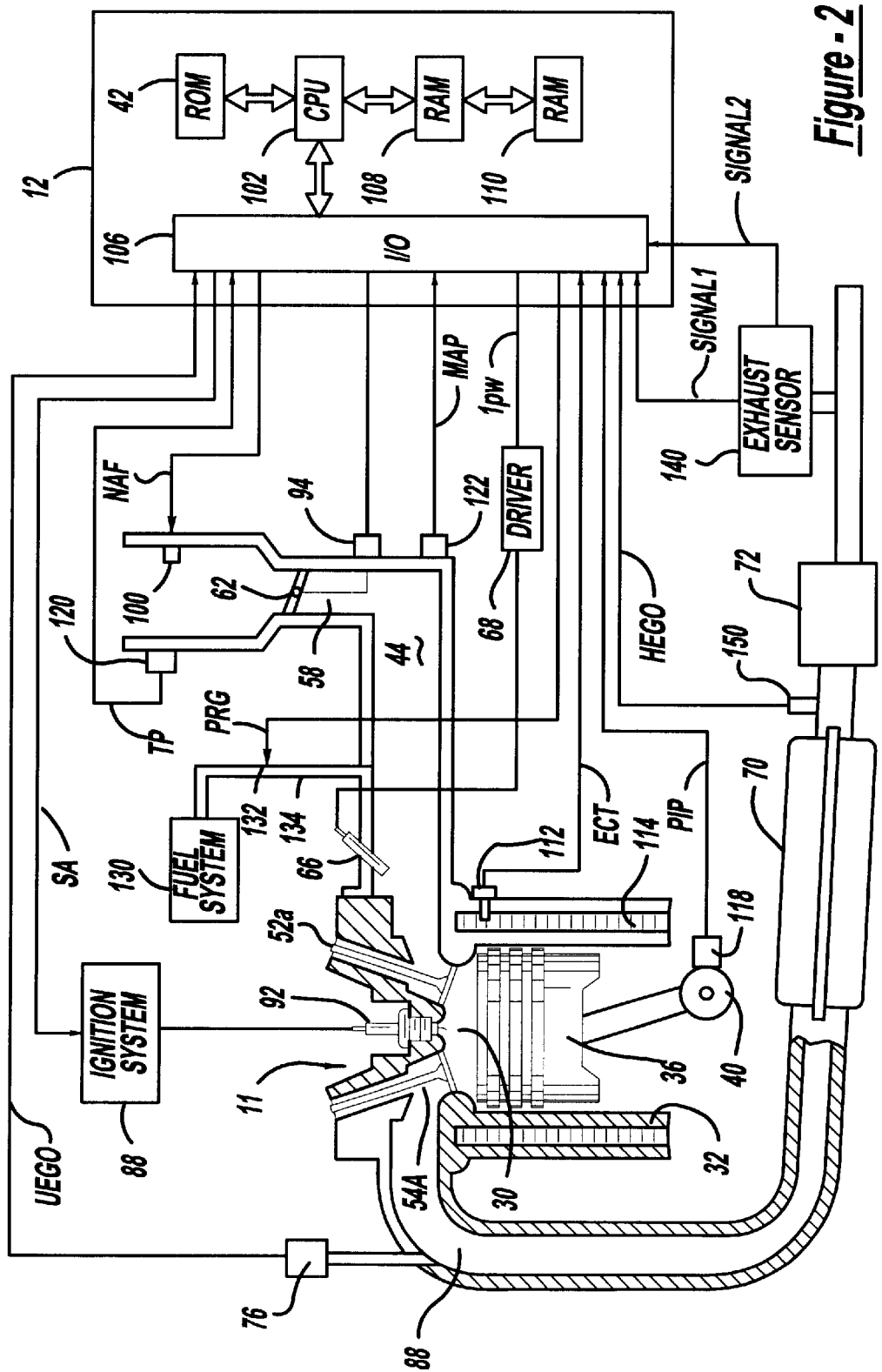
FIG. 2 is a block diagram of an engine in which the invention is used to advantage.

A block diagram illustrating an engine control system and method for a representative internal combustion engine according to the present invention is shown in FIG. 1. Preferably, internal combustion engine 10, further described herein with particular reference to FIG. 2, is shown coupled to torque converter 9 via crankshaft 13. Torque converter 9 is also coupled to transmission 11 via turbine shaft 17, which is also known as a transmission input shaft. Torque converter 9 has a bypass clutch (not shown), which can be engaged, disengaged, or partially engaged. When bypass clutch is disengaged, torque converter 9 is said to be in an unlocked state. Transmission 11 is an electronically controlled continuously variable transmission (CVT), comprising an input pulley 8 having a radius $R_i$ that is adjusted relative to the radius $R_o$ of an output pulley 7, affecting the movement of a belt 6, and thus providing a continuously variable transmission gear ratio to a drive axle 5. Both the input and the output pulleys are equipped with pulley speed sensors (nor shown), which provide signals that are used in determining transmission ratio. The winding radius of the belt is changed by applying hydraulic pressures to the input and output pulleys.

Internal combustion engine 10 having a plurality of cylinders, one cylinder of which is shown in FIG. 2, is controlled by electronic engine controller 12. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20. In a preferred embodiment, sensor 16 is a HEGO sensor as is known to those skilled in the art.

Intake manifold 44 communicates with throttle body 64 via throttle plate 66. Throttle plate 66 is controlled by electric motor 67, which receives a signal from ETC driver 69. ETC driver 69 receives control signal (DC) from controller 12. Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown).

Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64 (alternatively, inducted air flow can be determined form a manifold absolute pressure (MAP) sensor located in the engine intake manifold, and engine speed); engine coolant temperature (ECT) from temperature sensor 112 coupled to cooling jacket 114; a measurement of throttle position (TP) from throttle position sensor 117 coupled to throttle plate 66; a measurement of turbine speed ($W_t$) from turbine speed sensor 119, where turbine speed measures the speed of shaft 17, and a profile ignition pickup signal (PIP) from Hall effect sensor 118 coupled to crankshaft 13 indicating an engine speed ($W_e$). Alternatively, turbine speed may be determined from vehicle speed and gear ratio.

Continuing with FIG. 2, accelerator pedal 130 is shown communicating with the driver's foot 132. Accelerator pedal position (PP) is measured by pedal position sensor 134 and sent to controller 12.

In an alternative embodiment, where an electronically controlled throttle is not used, an air bypass valve (not shown) can be installed to allow a controlled amount of air to bypass throttle plate 62. In this alternative embodiment, the air bypass valve (not shown) receives a control signal (not shown) from controller 12.

Figure 3:
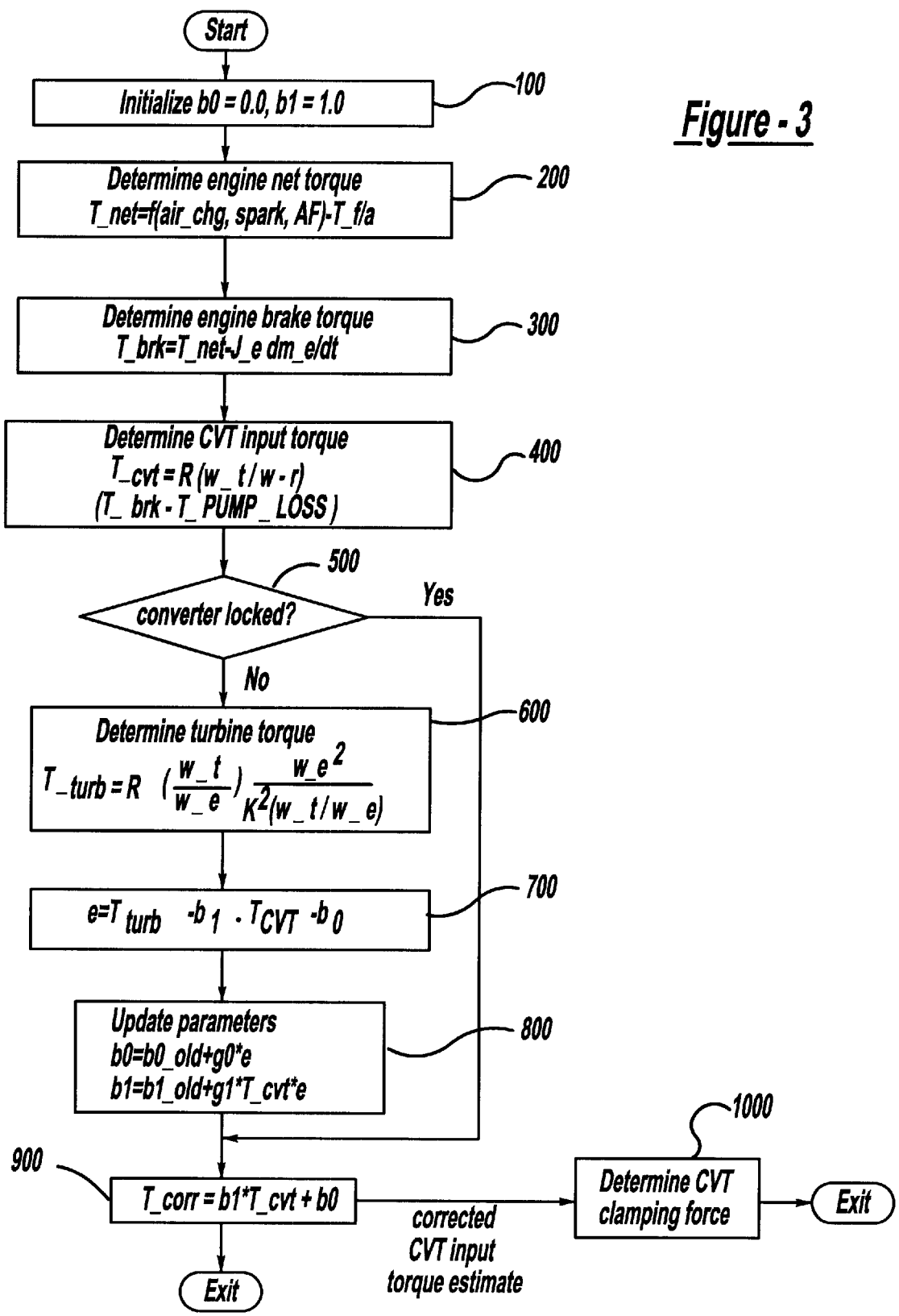
FIG. 3 is a block diagram of an embodiment in which the invention is used to advantage.

The diagram in FIG. 3 generally represents operation of one embodiment of a system or method according to the present invention. As will be appreciated by one of ordinary skill in the art, the diagram may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features and advantages of the invention, but is provided for ease of illustration and description. Although not explicitly illustrated, one of ordinary skill in the art will recognize that one or more of the illustrated steps or functions may be repeatedly performed depending on the particular strategy being used.

Referring now to FIG. 3, the routine begins in step 100 wherein adaptive parameters $b_0$ and $b_1$ are initialized and set to 0 and 1 respectively. Parameters $b_0$ and $b_1$ are slope and offset coefficients for the relationship between the engine torque based estimate of the CVT input torque and the torque converter torque based estimate of the CVT input torque. Proceeding to step 200, net engine torque, $T_{net}$ is estimated as a difference between $T_{ind}$ (engine indicated torque estimated based on engine operating conditions, such as air-charge, spark advance, air-fuel ratio, air and coolant temperatures, etc), and $T_{fla}$ (torque due to friction, pumping, and accessory loading losses). $T_{fla}$ could be determined from a look-up table as a function of engine operating conditions and the type of accessories that are engaged (i.e., air-conditioning, power steering, etc).

Proceeding now to step 300, $T_{brk}$, instantaneous torque at the input to the torque converter, is determined as follows:

$$T_{brk} = T_{net} - J_{eq} \cdot \frac{d}{dt} w_e$$

wherein $J_{eq}$ is the total moment of inertia of the engine, and $w_e$ is engine speed. Next, in step 400, the engine torque-based estimate of the input torque to the CVT, $T_{cvt}$, is determined:

$$T_{cvt} = R\left(\frac{w_t}{w_e}\right)(T_{brk} - T_{pl})$$

wherein $$R\left(\frac{w_t}{w_e}\right)$$

is the torque converter torque ratio determined experimentally as a function of engine speed and turbine speed, and $T_{pl}$ is the torque converter pumping loss that could be determined from a look-up table as a function of engine speed, or torque converter speed ratio. Thus, the input torque into the CVT is estimated by estimating engine brake torque based on operating conditions, reducing it by the converter pumping torque, and multiplying the result by the converter torque ratio determined as a function of the converter speed ratio.

Next, in step 500, a determination is made whether the torque converter clutch is locked. If the answer to step 500 is YES, the adaptive algorithm cannot be performed, and the routine proceeds to step 900. If the answer to step 500 is NO, the adaptive parameters can be updated, and the routine proceeds to step 600 wherein the torque converter-based estimate of the CVT input torque is determined as follows:

$$T_{turb} = R\left(\frac{w_t}{w_e}\right)\frac{w_e^2}{K2\left(\frac{w_t}{w_e}\right)}$$

wherein K is a torque converter capacity factor which is determined experimentally as a function of a torque converter speed ratio. The routine then proceeds to step 700 the error between $T_{turb}$ and the current corrected $T_{cvt}$ is determined:

$$e = T_{turb} - b_1 \cdot T_{cvt} - b_0.$$

The routine then proceeds to step 800 wherein $b_0$ and $b_1$ are updated such that the error between the two torque estimates is minimized:

$$b_0 = b_0 + \gamma_0 \cdot e$$

$$b_1 = b_1 + \gamma_1 \cdot T_{cvt} \cdot e$$

wherein $\gamma_0$ and $\gamma_1$ are adaptation gains.

Next, in step 900, a corrected value of the CVT input torque estimate is obtained:

$$T_{corr} = b_1 \cdot T_{cvt} + b_0$$

The routine then proceeds to step 100 wherein f, the clamping force to be applied the secondary pulley is determined according to the following formula:

$$f = T_{corr} \cdot \frac{\cos\alpha}{2 \cdot R_{pr} \cdot C}$$

wherein $\alpha$ is a secondary pulley angle, $R_{pr}$ is the primary pulley operating radius which is dependent on the geometric properties of the pulley system and the transmission ratio, and C is the coefficient of friction between the belt and the pulleys. Alternatively, the clamping force could be determined from a look-up table based on the corrected CVT input torque estimate and the transmission ratio, which is determined based on operating conditions, such as engine speed, transmission input speed, and input and output pulley speeds. The clamping force is applied by controlling hydraulic line pressure in the CVT.

Additionally, the corrected transmission torque estimate could be used for improved shift control in a conventional automatic transmission, various engine torque and emission control strategies, etc.

Thus, according to the present invention, it is possible to obtain an accurate estimate of the CVT input torque by learning the adaption coefficients based on the information provided by the unlocked torque converter, and calibrating the engine model to correct the engine torque-based estimate such that proper CVT clamping forces could be determined.

This concludes the description of the invention. The reading of it by those skilled in the art would bring to mind many alterations and modifications without departing from the spirit and the scope of the invention. Accordingly, it is intended that the scope of the invention be defined by the following claims:

What is claimed is:

1. A method for controlling a powertrain of a vehicle having an engine coupled to a continuously variable transmission, the vehicle further having a torque converter coupled between the engine and the transmission, the method comprising:
   providing an indication that a torque converter clutch is unlocked;
   learning a powertrain torque correction value when said indication is provided;
   adjusting a powertrain torque estimate based on said correction value; and
   determining a signal for controlling a transmission clamping force based on said adjusted powertrain torque estimate.

2. The method as set forth in claim 1 wherein said powertrain torque is a transmission input torque.

3. The method as set forth in claim 1 wherein said powertrain torque estimate is based on an operating condition.

4. The method as set forth in claim 3 wherein said operating condition is mass airflow.

5. The method as set forth in claim 3 wherein said operating condition further comprises engine speed.

6. The method as set forth in claim 1 wherein said powertrain torque correction value is determined based on a ratio of an engine speed and a turbine speed speed.

7. The method cited in claim 1 wherein said clamping force is further determined based on geometric properties of a transmission pulley system.

8. A system for controlling a powertrain of a vehicle, the system comprising:
   an engine;
   a continuously variable transmission;
   a torque converter comprising a torque converter clutch, said torque converter coupled between said engine and said transmission; and
   a controller for determining a torque correction value when said torque converter clutch is unlocked, and calibrating an engine model based on said correction value, said controller calculating a transmission input torque based on said calibrated engine model, and adjusting a transmission clamping force based on said transmission input force.

9. The method cited in claim 8 wherein said engine model is based on an engine operating condition.

10. The method cited in claim 9 wherein said engine operating condition is mass airflow.

11. The method as set forth in claim 10 wherein said engine operating condition further comprises engine speed.

12. The method cited in claim 8 wherein said correction value is calculated based on based on a torque converter ratio.

13. The method cited in claim 12 wherein said correction value is further calculated based on physical properties of said torque converter.

14. The method cited in claim 8 wherein said controller further determines said transmission clamping force based on geometric properties of a transmission pulley system.

15. A method for controlling a powertrain of a vehicle having an engine coupled to a continuously variable transmission, the vehicle further having a torque converter coupled between the engine and the transmission, the method comprising:

estimating a first powertrain torque based on a torque converter characteristic when the torque converter clutch is unlocked;

estimating a second powertrain torque based on an engine operating condition and said estimated first powertrain torque; and calculating a required transmission clamping force based on said second estimated powertrain torque.

16. The method as set forth in claim 15 wherein said torque converter characteristic is a torque converter ratio.

17. The method as set forth in claim 15 wherein said first powertrain torque estimating is further based on a ratio of a transmission input speed and an engine speed.

18. The method as set forth in claim 15 wherein said engine operating condition is mass airflow.

19. The method as set forth in claim 15 wherein said operating condition further comprises engine speed.

* * * * *